Nov. 10, 1953 E. H. GRONLUND 2,658,986
ELECTRICALLY HEATED LUNCH BOX
Filed July 7, 1951 2 Sheets-Sheet 1
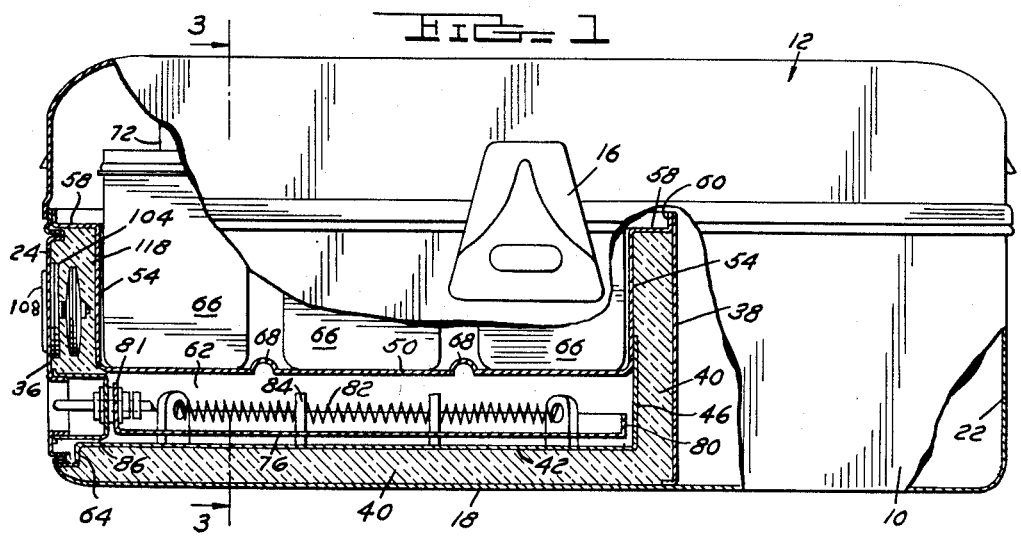
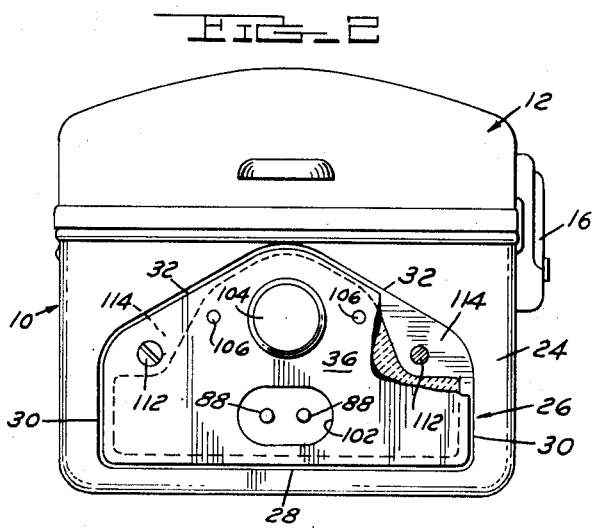
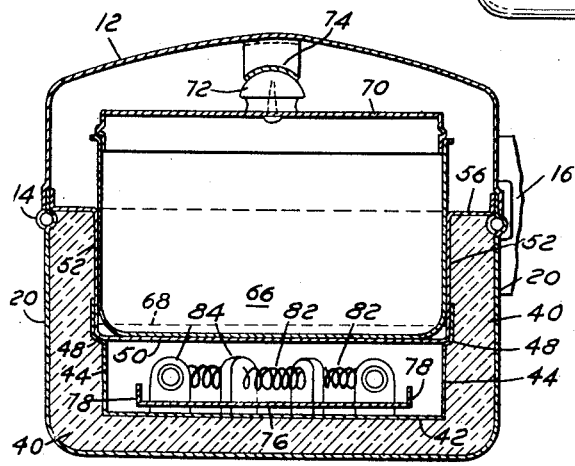
INVENTOR.
ERNST H. GRONLUND
BY
*Burton & Parker*
ATTORNEYS Nov. 10, 1953 E. H. GRONLUND 2,658,986
ELECTRICALLY HEATED LUNCH BOX
Filed July 7, 1951 2 Sheets-Sheet 2
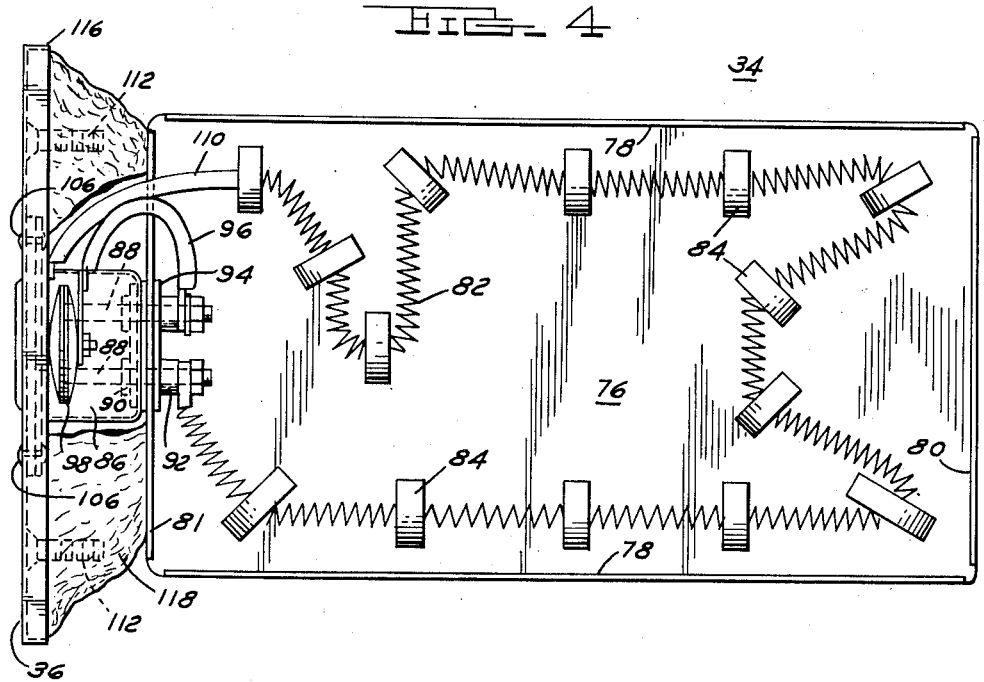
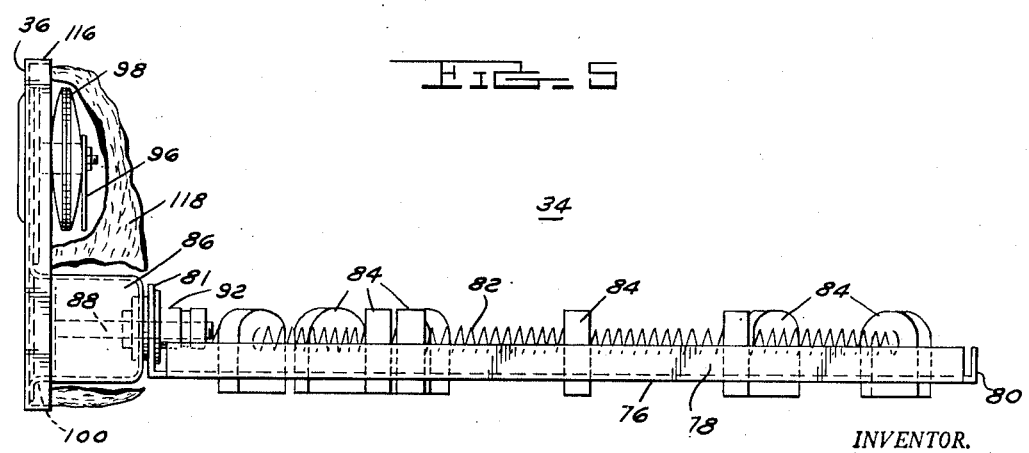
INVENTOR.
ERNST H. GRONLUND
BY
Burton & Parker
ATTORNEYS Patented Nov. 10, 1953

2,658,986

UNITED STATES PATENT OFFICE 2,658,986

ELECTRICALLY HEATED LUNCH BOX

Ernst H. Gronlund, Algonac, Mich.

Application July 7, 1951, Serial No. 235,644

4 Claims. (Cl. 219—35)

This invention relates to lunch boxes and more particularly to an improved electrically heated lunch box.

An important object of the invention is to provide a lunch box designed in a novel manner for heating the contents thereof and for incorporating an electrical heating unit which is readily removable for repair and replacement. Another important object of the invention is to provide an electrically heated lunch box having an insulated compartment for heating food contents and which is arranged to protectingly receive a removable electrical heating unit. A further important object of the invention is to provide an improved lunch box structure which is composed of parts capable of being manufactured and assembled at low cost and which is adaptable at the time of manufacture to receive any one of several different forms of electrical heating appliances.

In carrying out the objects of the invention, the lunch box is designed to provide an insulated compartment in which a removable electrical heating unit is received. A feature of the invention is the provision of a horizontal partitioning member which sealingly divides the insulated compartment into an upper section and a lower section. The upper section of the compartment is arranged to receive and support a plurality of food retaining receptacles. The lower section of the compartment is designed to protectingly enclose the electrical heating unit.

An important feature of the invention is the manner of incorporating the electrical heating unit in the lunch box structure such that it is capable of being removed and reinserted into the lunch box at any time after the manufacture thereof. This enables the manufacturer to install any one of several different types of electrical heating units into a lunch box as desired by his customers or trade in any particular locality. It also provides convenient repair and replacement of the electrical heating unit by the purchaser without interrupting the use of the lunch box and at no or little cost to the customer.

To this end, one wall of the insulated compartment is common to an exterior wall of the lunch box. The exterior wall, which is preferably an end wall of the lunch box, is provided with an opening into the compartment and preferably into the lower section thereof which is of a size to permit the electrical heating device to be slidably inserted and removed therefrom. The electrical heating device is designed in a novel manner to include an insulated wall portion which cooperates with the walls of the insulated compartment to complete the insulation around the area circumscribed by the walls of the compartment. Also associated with the electrical heating device, and preferably so as to be disposed adjacent to the upper section of the insulated compartment, is a thermostat for controlling the operation of the heating device. All parts of the electrical heating device, including the insulated wall portion and the thermostat, are combined in a novel manner into a unitary assembly for convenient installation and removal from the lunch box at any time.

Various other objects, advantages and meritorious features of the invention will more fully appear from the following specification, appended claims and accompanying drawings wherein:

Fig. 1 is a front elevation of a lunch box constructed in accordance with this invention and partly broken away in section to show the interior arrangement thereof;

Fig. 2 is a view in elevation of the end of the lunch box through which the electrical heating unit is removably received;

Fig. 3 is a vertical cross sectional view taken along line 3—3 of Fig. 1;

Fig. 4 is a top plan view of the heating device showing the association of the thermostatic control and its mounting; and Fig. 5 is a side elevation of the electrical heating device showing the L-shaped configuration exhibited thereby.

In the illustrated embodiment of the invention, the lunch box exhibits an elongated rectangular formation including an upwardly opening body portion 10 and a cover or lid 12 which may be hinged to the body 10 as shown at 14 in Fig. 3. One or more latches 16 are provided on the opposite side of the box from the hinge securing the cover tightly against the upper edges of the body 10.

The body portion 10 of the lunch box structure includes a bottom 18, oppositely disposed parallel side walls 20—20 and a conventional end wall 22 at one end of the structure. The lunch box is designed to removably receive an electrical heating device and for this purpose one of the walls of the body portion 10 is provided with an opening to the exterior through which the unit is insertable. In the illustrated embodiment of the invention, the end of the structure opposite to the wall 22 is shaped in a novel manner to provide such an opening for receiving and retaining an electrical heating device in flush relation to the exterior walls of the structure.

Referring to Fig. 2, the end wall through which the heating unit is removably received is referred to by character 24. It is provided with a relatively large opening therethrough generally indicated at 26. This opening preferably has the configuration shown in Fig. 2. It is provided with a long horizontal bottom edge 28, parallel vertical side edges 30—30, and converging edge portions 32—32 which meet close to the upper edge of the body 10. Removably received through this opening is an electrical heating device generally indicated at 34 in Figs. 4 and 5 and including as a part of the device a vertical wall 36 which conforms to the configuration of the opening 26 and is capable of closely fitting the same in flush relation to the end wall 24 of the lunch box.

The body portion of the lunch box is provided interiorly with an insulated area or food warming compartment which is heated by the electrical heating unit. The compartment is composed of double walls spaced apart from one another and between which insulation is placed. As shown in Fig. 1, the compartment is preferably located closer to one end of the lunch box than the other end and so that one wall thereof is common to the apertured end wall 24.

In the interior of the body 10 there is provided a transverse vertically extending partition member 38 which is substantially equal to the interior cross-section of the body 10 and which serves as the interior end wall of the food warming compartment. The bottom 18, side walls 20—20, partition 38, and the end wall 24 serve as the outer walls of the food warming compartment. Lining these wall portions is an insulation material indicated at 40. This insulation is preferably relatively thick as shown in Figs. 1 and 3 and may be formed of glass wool batting. With the exception of the opening 26 in the end wall 24, the lining of insulation 40 forms an upwardly opening enclosure or shell of insulated material within the body 10.

The inner wall portions of the double walled food warming compartment are formed by two vertically disposed members of generally dished or channelled formation and partially nesting one within the other. The lower member of this assembly is composed of a bottom plate section 42, opposite upstanding side wall sections 44—44 are integrally connected to the plate section and which rise to approximately half the height of the food warming compartment, and an end wall 46 in the interior of the body 10 which rises to the same level as the side wall sections. The plate section 42 overlies the insulation lining the bottom 18 of the lunch box and extends in spaced parallel relation thereto as is indicated in Figs. 1 and 3. The side wall sections of the lower member overlie the side wall insulation material for the extent of their height and are spaced inwardly in parallel relation to the exterior side walls 20—20 of the lunch box as shown in Fig. 3. The two side wall sections 44—44 are similarly deformed or jogged outwardly intermediate their heights as shown at 48 to form shoulders on opposite sides of the food compartment for receiving and supporting the upper member of the compartment assembly. The interior end wall 46 of the lower member overlies the insulation material lining the partition 38 and extends in spaced parallel relation thereto.

The upper member forming the inner wall of the food warming compartment assembly is likewise of generally dished or channelled formation and comprises a bottom plate section 50, two integrally connecting upstanding side wall sections 52—52, and two integrally connecting upstanding end wall sections 54—54. The upper member is so dimensionally proportioned that it will slidingly fit the interior of the food warming compartment and rest upon the shoulders 48—48 of the side walls 44—44 of the lower member as shown in Fig. 3. Received and supported in this manner, the side and end wall sections 52—52 and 54—54 of the upper member compactly lie against the insulation 40 of the food warming compartment. The upper ends of the side and end wall sections 52—52 and 54—54 of the upper member are turned outwardly as indicated at 56 and 58 respectively on all sides of the upper member to form surrounding flange portions overlying the upper end of the insulation material. The extremities of these flanged portions are turned upwardly as indicated at 60 and may be spot welded or otherwise rigidly secured to the upper end portions of the outer side walls of the food compartment. In this manner, the insulated double-walled food compartment is formed.

The bottom plate section 50 of the upper member of the food warming compartment assembly extends in spaced parallel relation to the bottom plate section 42 of the lower member and the two together cooperate to form a narrow elongated chamber 62 preferably extending the full length and width of the interior dimension of the food warming compartment. It is in this chamber that the removable electric heating device 34 is received. The chamber 62 opens out through the lower portion of the aperture 26 formed in the end wall 24 of the lunch box. At the entrance or opening of the chamber 26, the plate section 42 of the food warming compartment is preferably depressed for the width of the aperture 26 to form a shoulder 64. The adjacent portion of the bottom 18 of the lunch box may be lapped over the depressed portion of the plate section 42 as shown in Fig. 1 and the two overlapping portions may be spot welded or otherwise rigidly connected together.

Received within the upper member of the food warming compartment and resting upon the bottom plate section 50 thereof are one or more food containing receptacles 66. In the illustrated embodiment of the invention three such receptacles are provided arranged in a horizontal row and preferably separated from one another by upwardly projecting ribs 68 pressed out of the bottom plate section 50 upon which they rest. Each receptacle is provided with a removable cover or lid 70. All three of the receptacles are elongated in one dimension and are placed in the food compartment with their long dimension extending transversely to the lunch box. They are designed to slidably fit the side wall sections 52—52 of the upper member of the compartment as shown in Fig. 3 and to project above the flanges 56 and 58 and into the hollow interior of the main cover 12 of the lunch box. Each receptacle lid 70 is provided with a handle 72 projecting upwardly therefrom and which terminates short of the under side of the lunch box cover 12. Carried in depending relation to the under side of the lunch box cover 12 is an elongated metallic strip 74 which is shaped to engage the upper ends of the handles 70 and tightly compress the lids 70 upon their respective receptacles when the lunch box cover 12 is moved to closed position.

The electrical heating unit 34 comprises a main body member preferably in the form of a shallow metallic tray 76 of sheet steel, for example, including short oppositely disposed side walls 78—78 and end walls 80 and 81. The end wall 81 of the tray adjacent to the entrance to the chamber 62 is preferably made so as to extend to a greater height than the opposite end wall 80. An electrical heating element or coil 82 is supported above the bottom of the tray and may be arranged in the pattern shown in the Fig. 4. A plurality of insulators 84, which may be of porcelain, are employed to support the heating element in spaced relation to the bottom of the tray. As in conventional practice each insulator is provided with an aperture through which the heating element 82 is led. The base of each insulator 84 is reduced in lateral extent and projects through slots formed in the bottom of the tray 76 and downwardly therebelow as shown in Fig. 5. The insulators project equal distances from the bottom side of the tray for sliding contact with the plate section 42 of the food warming compartment. It is evident from Figs. 1 and 3 that the tray 76 together with the heating element 82 is removably slidably insertable through the opening of the chamber 62 and when received therein the heating coil 82 is disposed approximately midway between the bottom plate 42 and the upper plate 50.

Carried on the forward or outer end of the tray 76 is a cup-shaped member 86 which serves as a socket for receiving a terminal plug of the conventional type used for connecting an electrically operated device with a source of electrical current. Within the socket are a pair of contact pins 88—88 over which the plug is received. The contact pins extend through the base end of the socket 86 and through the adjacent end of the wall 81 of the tray and nuts 90 and 92 on the inner and outer end sections of each pin serve to secure the socket to the tray. Suitable insulating means, such as mica washers 94, are utilized to separate the contact pins from the wall 80 of the tray. One end of the heating coil 82 is connected to one of the contact pins 88 as shown in Fig. 4. Connected to the inner end of the opposite contact pin 88 is a lead wire 96 extending to a thermostat indicated by the reference character 98.

Forming a part of the heating device and being removable therewith is the vertical wall 36 previously described which closes the opening 26 of the lunch box. The wall 36 is secured to the outer end of the cup-shaped member or socket 86 and for this purpose the latter may have its outer edges turned or flanged outwardly as shown at 100 in Fig. 5. The wall 36 may be spot welded or otherwise rigidly secured to these flanged portions of the socket 86. The wall 36 is provided with a relatively small opening 102 shown in Fig. 2 which aligns with the socket 86 and conforms generally to its interior configuration. This opening exposes the terminal pins 88—88 for reception of the terminal plug.

The thermostat 98 is secured to the upper inside portion of the end wall 36 on a level above that of the heating element 82 and the horizontal partition 50 which divides the food warming compartment into upper and lower sections. The thermostat may be of any suitable construction for the purpose and as herein shown it is of the disc type which is capable in the presence of heat of shifting or snapping its center portion from one side to the other side. The thermostat is secured to a circular plate 104 which in turn is secured by rivets 106 to the back side of the wall 36 as best shown in Fig. 4. A removable circular plate 108 may be provided in the wall 36 above the socket 86 and in line with the thermostat in order to gain access thereto if necessary.

As previously mentioned the lead wire 96 connects one of the terminal pins 88 with the thermostat. The opposite end of the heating coil is also connected to the thermostat by means of a lead wire 110. As a result, a normally closed circuit is formed extending from one terminal pin through the heating coil, the thermostat, and to the other terminal pin. The thermostat is designed to break this circuit when the temperature reaches a predetermined level.

The heating coil supporting tray 76 together with the wall 36 forms a unitary assembly which is capable of being attached to and readily removed from the lunch box at any time. When the assembly is mounted in the lunch box to the fullest extent of its movement, it is detachably secured in position by means of two screws 112—112 carried by the wall 36 of the unit and exposed to view as shown in Fig. 2. The recessed opening into which the wall 36 of the assembly is received is provided with two shouldered portions 114—114 adjacent to the upper corners thereof which are provided with holes aligning with the screws and into which the latter are threaded. When the screws are tightened in their respective holes in the wall sections 114—114, the end wall 36 of the unit is brought up into flush relation with the exterior end wall 24 of the lunch box as is shown in Fig. 1.

The wall 36 of the heating unit is preferably provided with an inturned flange 116 completely around the outer margin thereof, which is shaped to enter the opening 26 of the end wall 24 and substantially abut the recessed shoulder 64 and the recessed shouldered portions 114—114 disposed within the opening. Adhesively or otherwise secured to the inner surface of the wall 36 around the thermostat is a pad of insulating material such as shown at 118 in Figs. 4 and 5. This pad may be of the same material as the insulation 40 previously described and when the heating unit is fully inserted into the lunch box the pad is compressed against the adjacent inner end wall 54 of the food warming compartment as shown in Fig. 1.

There is provided as a result of this invention an improved lunch box which forms a sealed housing for the removable heating unit. The food warming compartment is designed to receive the heating unit in shielded relation to the receptacles 66 and the upper part of the lunch box. The bottom plate 50 of the upper member of the food warming compartment serves as a horizontal partitioning member dividing the interior of the food compartment into an upper section for receiving the food receptacles and a lower section into which the heating coil unit is placed. This partition serves to seal the heating unit away from the food receptacles and prevents liquids and moisture from penetrating the chamber 62 in which the coil is disposed at all times, and particularly during any cleaning of the lunch box or when the cover is opened and the interior exposed to the elements of the weather.

As a further result of the invention, there is provided a replaceable heating unit which enables the purchaser to quickly detach the unit for repair or replacement and thereby enabling him to continue the use of the lunch box while repairs are made on the heating coil originally provided. This feature also enables the manufacturer of the lunch box to substitute heating units having different operating voltages and to adapt the lunch boxes to various types of conditions which the trade may demand in different localities of the country. The lunch box therefore may be made in one standard size and formation and various different types of heating units employed to meet the requirements of the trade. The thermostat is carried along with the heating element and is removable together therewith for convenient inspection, repair, and replacement if necessary. The thermostat is mounted on an end wall forming an integral part of the removable unit and the wall is so designed and shaped as to cooperate with the food warming compartment to complete the insulation therearound. It is to be noted that the end wall 36 together with the tray 76 forms an L-shaped configuration, the horizontal component of which carries the heating coil and is slidably received in the chamber 62, and the vertical component of which carries the thermostat and a part of the insulation for the food warming compartment and is demountably received in the recessed opening of one of the end walls of the lunch box.

What I claim is:

1. A lunch box having a bottom, oppositely disposed side and end walls, and a hinged cover for the top thereof comprising, in combination; a vertical partition wall spaced from one end of said box and forming a compartment in the box at such end; two spaced apart horizontal walls spaced above the bottom of the box and extending from substantially the other end of the box to said partition; oppositely disposed side and end walls spaced from the complementary walls of the box and from said partition wall and joining said horizontal walls to form an upper and a lower compartment in the box; insulating material filling the spaces between the respective walls of the box and the complementary walls of said upper and lower compartments and between the compartments and the partition wall; the end wall of the box at said other end thereof partially cut away to provide an opening into the lower compartment; an electric heating unit adapted to be coupled with a source of electric power; said unit slidably disposed within the lower compartment and positioned therein spaced below the horizontal bottom wall of the upper compartment and adapted to heat the upper compartment; an upstanding wall mounted on the unit at the end thereof adjacent said other end of the box and adapted to cover the opening in and abut the wall of the box to hold the unit in fixed relationship to the box when the unit is disposed as aforesaid in the lower compartment; and thermostatic control means mounted on said upstanding wall adjacent one end of the upper compartment and electrically coupled with said heating unit to make and break a circuit thereto in response to determined temperatures within the upper compartment.

2. In a lunch box including a bottom, oppositely disposed side and end walls, and a hinged cover for the top thereof; a vertical partition spaced from one end of the box and forming a compartment in such end; a horizontally extending bottom wall spaced above the bottom of the box and extending substantially from the other end of the box to said partition dividing the box between the partition and said other end of the box into an upper and a lower compartment; insulating material disposed across a surface of said partition and insulating the first mentioned compartment from the other compartments; the end wall of said box adjacent the upper and lower compartments partially cut away opposite the lower compartment to provide an opening thereinto from without the box; an electric heating unit slidably receivable within the lower compartment adapted to be coupled with a source of electric energy and said unit provided with a heating element spaced below said horizontally extending bottom wall but in heat exchange relationship therewith and adapted to heat said upper compartment when the element is energized; an upstanding leg mounted on said unit at the end thereof adjacent said opening in the box and adapted to close said opening when the unit is disposed within the lower compartment; fasteners adapted to engage said leg and the wall of the box adjacent said opening to hold the leg and heating unit in fixed relationship to the box; and thermostatic control means coupled with the heating element and mounted on said leg in heat responsive relationship to the upper compartment and adapted to make and break a circuit to said element in response to determined temperature changes in the upper compartment.

3. In a lunch box including a bottom, oppositely disposed side and front and back walls, and a hinged cover for the top thereof; a vertical partition wall spaced from the back wall of the box and forming a compartment in such end; a box-like structure having a bottom and oppositely disposed side walls and an end wall disposed within the front end of the lunch box with the walls of such structure spaced from the corresponding walls and the partition of the lunch box; insulating material filling the spaces between the walls of the box-like structure and the corresponding walls and vertical partition of the lunch box; said walls of the box-like structure shaped to define a shoulder portion extending around and spaced from the top edge of such structure; a second box-like structure having bottom and oppositely disposed side and end walls and adapted to nest in and seat upon the shoulders of said first box structure in spaced relation from the walls and partition of the lunch box; insulating material filling the spaces around the side and end walls of the second box structure; the front wall of the lunch box partially cut away to form a somewhat triangularly shaped opening therethrough with the base of said opening substantially level with the bottom of the first box-like structure and opening thereinto and the apex of the triangular opening disposed opposite an end wall of the second mentioned box-like structure; a heating unit adapted to be received through said opening and slidably seat upon the bottom of the first mentioned box-like structure; an upstanding leg mounted at one end of said unit and adapted to close the opening in the front wall of the box when the unit is disposed within the first mentioned box-like structure; and means for retaining said leg in fixed relation over said opening to fixedly position said unit within the first mentioned box-like structure; and a thermostatic control device coupled with said heating unit and mounted on said upstanding leg and receivable through the opening in the front wall of the box to be positioned in heat responsive relation to said second mentioned box structure when the heating unit is disposed within the first mentioned box-like structure.

4. In a lunch box including a bottom, oppositely disposed side and front and rear walls; a vertical insulated partition wall spaced from one end of the box and extending between the front and rear walls and forming a compartment in such end; a horizontally disposed bottom plate spaced above the bottom of the box and extending substantially from said end wall to the partition forming an upper and a lower compartment in such end of the box; said end wall of the box partially cut away to provide an opening therethrough into the lower compartment; an electric heating unit removably slidably insertable through said opening and adapted to seat within said lower compartment; an upstanding positioning leg mounted upon one end of the unit and adapted to abut said end wall of the box to close the opening therethrough and fixedly position said unit within the lower compartment; and means to removably retainingly hold said leg in abutting relationship to said end wall.

ERNST H. GRONLUND.

References Cited in the file of this patent

UNITED STATES PATENTS

| Number | Name | Date |
|---|---|---|
| 1,005,357 | Sykes | Oct. 10, 1911 |
| 1,188,734 | Clement | June 27, 1916 |
| 1,341,994 | Nelson | June 1, 1920 |
| 1,685,030 | Lavoie | Sept. 18, 1928 |
| 2,187,196 | Douglass | Jan. 16, 1940 |
| 2,535,379 | White | Dec. 26, 1950 |
| 2,545,127 | Wnuk | Mar. 13, 1951 |
| 2,577,870 | Aston | Dec. 11, 1951 |